May 2, 1950  J. M. LONG  2,505,978
MECHANICAL DRIVE MECHANISM
Filed Feb. 12, 1946  2 Sheets-Sheet 1

INVENTOR
James M. Long
BY
ATTORNEY

May 2, 1950 J. M. LONG 2,505,978
MECHANICAL DRIVE MECHANISM
Filed Feb. 12, 1946 2 Sheets-Sheet 2

INVENTOR
James M. Long
BY
ATTORNEY

Patented May 2, 1950

2,505,978

UNITED STATES PATENT OFFICE 2,505,978

MECHANICAL DRIVE MECHANISM

James M. Long, Henderson, Nev., assignor to Associated Engineers, Inc., Las Vegas, Nev., a corporation of Nevada Application February 12, 1946, Serial No. 646,974

2 Claims. (Cl. 74—70)

This invention has to do with a mechanical drive mechanism or power transmission and it is a general object of the invention to provide a simple, compact, effective mechanism operable either to convert rotary movement into oscillatory movement or oscillatory movement into rotary movement.

There are numerous situations where it is desired to convert rotary motion into oscillatory motion, while in other cases it is desired to convert oscillatory motion into rotary motion. Structures have heretofore been provided for these purposes but as far as I am aware they have generally been such that they are not reversible to act in either manner, and they are generally complicated, expensive and impractical structures not suitable for general use.

It is a general object of my present invention to provide a mechanism of the general character above referred to which is simple and inexpensive of manufacture. The mechanism that I have provided involves few simple parts that can be readily manufactured and which, by reason of their form and simplicity of construction, can be strong and durable.

It is a further object of my present invention to provide a mechanism of the general character referred to that is highly efficient in the handling of power. The mechanism that I have provided involves suitable bearings for the shafts leading into and out of the mechanism and the principal working bearing involved in the mechanism is a large anti-friction bearing, highly efficient in operation.

Another object of my present invention is to provide a mechanism of the general character referred to involving an arrangement and relationship of parts whereby the mechanism can be readily designed to produce or to be operated by oscillation of the oscillatory shaft through either a small angle or a wide angle.

Figure 1:
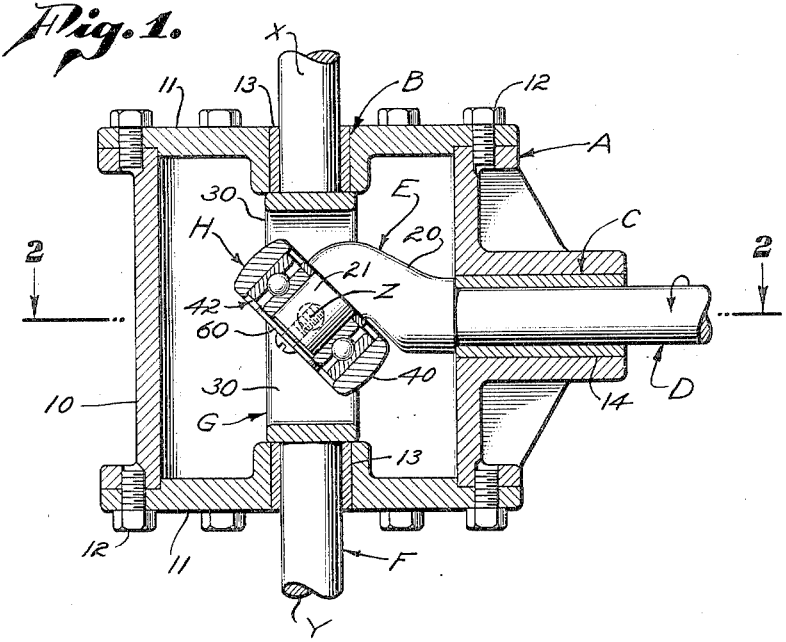
Figure 2:
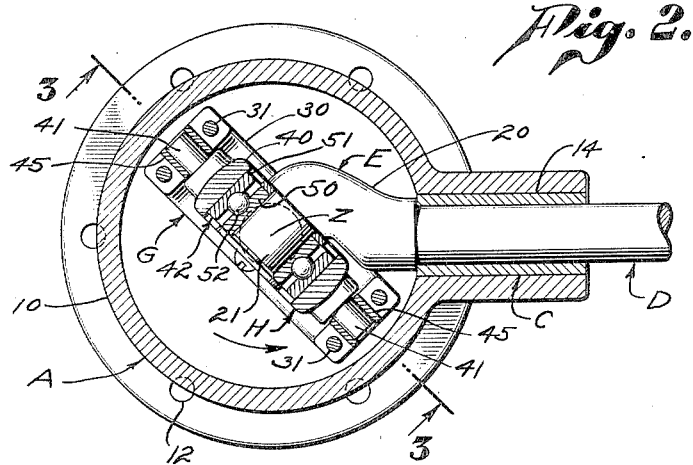
Figure 3:
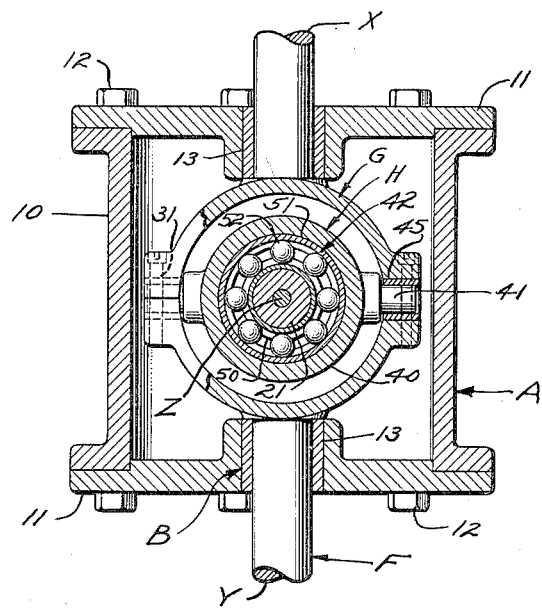
Figure 4:
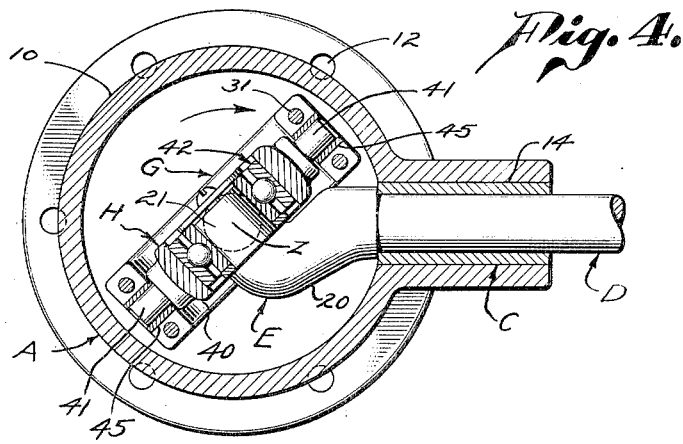

The various objects and features of my invention will be fully understood from the following detailed description of a typical preferred form and application of the invention, throughout which description reference is made to the accompanying drawings, in which:

Fig. 1 is a longitudinal sectional view of the mechanism that I have provided taken in the plane in which the two shafts of the mechanism lie and showing the mechanism in a position where the yoke ring on the oscillatory shaft is in a mid position. Fig. 2 is a detailed transverse sectional view taken as indicated by line 2—2 on Fig. 1 showing the rotating shaft turned 90° from the position shown in Fig. 1, in which position the yoke ring is tilted to one side. Fig. 3 is a detailed sectional view taken as indicated by line 3—3 on Fig. 2, and Fig. 4 is a detailed transverse sectional view similar to Fig. 2 showing the rotating shaft operated through 180° from the position shown in Fig. 2, in which case the yoke ring is tilted in the opposite direction.

The mechanism that I have provided can be carried out or incorporated in various forms and in any particular application of the mechanism variations and modifications may be made to best suit the operating conditions encountered. In the drawings I have, for purpose of example, shown one typical simple application of the invention and in that case the mechanism involves, generally, a frame or housing A, two bearing means carried by the housing in a common plane and at right angles to each other, one of which bearing means I will refer to as the longitudinal bearing means B and the other as the lateral bearing means C. The mechanism further involves a revolving shaft D carried by the lateral bearing means C, a head E on the shaft D within the frame or housing A, an oscillatory shaft F carried by the longitudinal bearing means B, a yoke ring G carried by the shaft F within the housing or frame A, and surrounding the head E, and drive means H between the head E and yoke ring G.

The frame or housing A is preferably a fabricated or built up structure and in the form shown it involves an elongate tubular body 10 and end plates 11 that are attached to the ends of the body and form closures therefor. I have shown the end plates secured to the body by screw fasteners 12 so that they can be removed to facilitate access to the interior of the housing.

The longitudinal bearing means B involves one or more bearing members or bearing parts 13 carried by the ends 11 of the housing, preferably so that they are on an axis concentric with and parallel to that of the body 10. In the particular form of the invention illustrated the oscillatory shaft F has two sections X and Y, carried by a bearing part 13 in each head 11, whereas it may be that only one shaft section is desired, in which case the other may be eliminated and if it is eliminated its corresponding bearing may, of course, be eliminated.

The lateral bearing means C involves a bearing part 14 projecting laterally of the body 10 on an axis normal to that of the bearing means B and intersecting that of the bearing means B within the housing A. In the drawings I have shown the bearing parts 13 and 14 as simple bushings whereas it is to be understood that they may, if desired, be anti-friction bearings or other more elaborate bearing means, as circumstances may require.

The revolving shaft D may be a simple plain shaft with a drive shaft or a driven shaft carried by the bearing 14 and projecting to the interior of the housing A.

The head E provided on the revolving shaft D is located within the housing A and although it may be varied widely in form and construction I prefer to form it integrally with the shaft and to form it so that it has but two simple parts, one an arm 20 and the other a trunnion 21. The arm 20 forms a coupling or mounting connecting the trunnion with the shaft so that the trunnion 21 is supported with its axis angularly related to the axes of the shafts D and F and intersecting the point at which the axes of the shafts D and F intersect. The degree of oscillation of the shaft F will depend upon the angularity of the trunnion 21 and where the oscillatory shaft is to move through an angle of 90° the trunnion 21 is located or pitched at an angle of 45° to the axis of the shaft D by which it is carried. It is further preferred that the arm 20 supports the trunnion 21 so that it is exposed and carries the means H at the zone where the shafts D and F intersect.

The oscillatory shaft, as shown in the drawings, involves the two sections X and Y which enter the housing A from opposite directions or through opposite ends 11 and it is preferred that the two shaft sections be tied rigidly together by the yoke ring G, as shown in the drawings.

In the particular construction shown in the drawings a yoke section 30 is mounted on the inner end of each section of the shaft F within the housing A and the two yoke sections are coupled or joined together as by screw fasteners 31 so that they form a rigid continuous yoke ring extending between the shaft sections X and Y and surrounding the head and particularly the trunnion 21 of the head. The yoke ring just described is made sufficiently large and the arm 20 that supports the trunnion 21 is so shaped as to allow for free oscillation of the yoke ring in the housing through the desired angle.

The drive means H provided between the head E and the yoke ring G involves primarily a drive block or ring 40 having external trunnions 41 by which it is mounted in the yoke ring and having an internal bearing 42 by which it is coupled or related to the trunnion 21. The block ring 40 is small enough to fit within the yoke ring with ample working clearance so that it can oscillate within the ring G and the trunnions 41 which project outwardly from the ring 40 to support it in the ring G are on an axis which intersects the point at which the axes of the shafts F and D intersect. It is preferred, in practice, to support the trunnions 41 in bearings 45 held between the sections 30 of the yoke ring G where they are secured together by the fastening means 31.

The bearing 42 is preferably an anti-friction bearing such as a ball bearing designed to handle radial thrust as well as axial thrust in both directions, and it may involve an inner ring 50 carried on the trunnion 21, an outer ring 51 held or mounted in the ring 40, and a plurality of balls 52 operating between the rings. The bearing just described serves to support the ring 40 on and concentric to the trunnion 21. In practice a suitable retaining plate 60 may be applied to the outer end of the trunnion 21 to hold the bearing in place thereon.

From the foregoing description it will be apparent that in the mechanism that I have provided the various working or moving parts are on axes that intersect at a common point that I have designated in the drawings Z. It is to be observed that the axes of the shafts D and F intersect the point Z, that the axis of the trunnion 21 intersects the point Z, and that the axes of the trunnions 41 intersect the point Z. With the arrangement and relationship of parts that I have provided and which I have described, power can be transmitted through the mechanism in either direction, that is, oscillatory motion imparted to the shaft F, for instance to either or both sections of the shaft F, will act through the mechanism to cause continuous rotation or rotary motion of the shaft D or continuous rotation of the shaft D will act through the mechanism to cause oscillation of the shaft F. It is believed that from the foregoing description of the arrangement and relationship of parts and from the illustration found in the accompanying drawings it will be apparent that as the shaft D turns the trunnion 21 turns bodily but not on its axis except at the point Z where the axis of the trunnion 21 intersects the central axis of the mechanism. When the mechanism is being driven from the shaft D it is the movement of the trunnion 21 which causes the yoke ring G to oscillate while the trunnion turns within the ring 40 and since the yoke ring is directly coupled to the shaft F the shaft sections F oscillate with the yoke ring. When the mechanism is operated in the opposite direction oscillation of the yoke ring G acts through the drive ring 40 so that the trunnion 21 is moved around or is turned so that the shaft D revolves.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A mechanism of the character described including, an elongate case having a side opening intermediate its ends, cover plates attached to the ends of the case closing the case and having aligned openings intersecting the axis of the side opening at a point within the case, a first shaft carried in the side opening and terminating in the case, a second shaft carried in the openings in the plates, a yoke in the second shaft and in the case and engaging the plates, a head fixed on the first shaft in the case, a trunnion projecting from the head and angularly related thereto and intersecting said point, a ring surrounding the trunnion and within the yoke, diametrically opposite projections on the exterior of the ring on an axis intersecting said point and rotatable in the yoke on an axis normal to that of the second shaft, and an annular anti-friction bearing having an inner race fixed on the trunnion and an outer race concentric in the ring.

2. A mechanism of the character described including, an elongate case having a side opening intermediate its ends, cover plates attached to the ends of the case closing the case and having aligned openings intersecting the axis of the side opening at a point within the case, a first shaft carried in the side opening and terminating in the case, a second shaft carried in the openings in the plates, a yoke in the second shaft and in the case and engaging the plates, a head fixed on the first shaft in the case, a trunnion projecting from the head and angularly related thereto and intersecting said point, a ring surrounding the trunnion and within the yoke, diametrically opposite projections on the exterior of the ring on an axis intersecting said point and rotatable in the yoke on an axis normal to that of the second shaft, and an annular anti-friction bearing having an inner race fixed on the trunnion and an outer race concentric in the ring, the yoke having two like opposed sections fixed on parts of the second shaft, each section having spaced arms, and means releasably connecting the arms with the said projections held therebetween.

JAMES M. LONG.

REFERENCES CITED

The following references are of record in the file of this patent:

UNITED STATES PATENTS

| Number | Name | Date |
|---|---|---|
| 1,059,568 | Ross | Apr. 22, 1913 |
| 1,075,308 | Skinner | Oct. 7, 1913 |
| 1,744,542 | Gough | Jan. 21, 1930 |
| 2,158,483 | Peterson | May 16, 1939 |
| 2,225,512 | Stiles | Dec. 17, 1940 |
| 2,228,839 | Miller | Jan. 14, 1941 |

FOREIGN PATENTS

| Number | Country | Date |
|---|---|---|
| 26,072 | Great Britain | of 1903 |